United States Patent [19]

Fukuhisa

[11] Patent Number: 4,864,294

[45] Date of Patent: Sep. 5, 1989

[54] POSITION DETECTOR WITH RADIO TRANSMITTER AND RECEIVER

[76] Inventor: Norio Fukuhisa, 45-2, Otsu, Kita-machi, Kanazawa-shi Ishikawa 920, Japan

[21] Appl. No.: 148,505

[22] PCT Filed: Jun. 4, 1987

[86] PCT No.: PCT/JP87/00355

§ 371 Date: Jan. 29, 1988

§ 102(e) Date: Jan. 29, 1988

[87] PCT Pub. No.: WO87/07712

PCT Pub. Date: Dec. 17, 1987

[30] Foreign Application Priority Data

Jun. 5, 1986 [JP] Japan ................................ 61-131620

[51] Int. Cl.⁴ ................................................ G01B 3/22

[52] U.S. Cl. ................................ 340/870.01; 340/680; 340/686; 33/561; 901/10

[58] Field of Search ...................... 340/870.01, 870.18, 340/680, 686, 687, 539, 540; 455/95, 97, 347, 351; 901/9, 10, 35, 46; 73/685.8; 33/558–561, 556

[56] References Cited

U.S. PATENT DOCUMENTS

| | | | |
|---|---|---|---|
| 4,509,266 | 4/1985 | Cusack | 340/686 |
| 4,558,312 | 12/1985 | Yonemoto | 340/680 |
| 4,578,874 | 4/1986 | Juengel | 340/686 |
| 4,693,110 | 9/1987 | Juengel | 340/680 |

*Primary Examiner*—Donald J. Yusko
*Assistant Examiner*—Tyrone Queen
*Attorney, Agent, or Firm*—Bauer & Schaffer

[57] ABSTRACT

In a position detector for detecting the position of an object to be detected by making a detecting needle contact with the object to be detected and for transmitting a detecting signal by radio wave, the detecting needle itself functions as a transmission antenna for transmitting the detecting signal to a receiving side apparatus located at a predetermined position. The specification of this application discloses, in addition to the above arrangement, the construction of a detecting head having both external and internal contacts, the fact for modulating the detecting signal by a double scale signal and then transmitting the same and the construction of auxiliary springs used to improve the accuracy with which the detecting needle is returned to its static position. The position detector of this invention is particularly suitable for detecting the position of a work set on a machining tool.

6 Claims, 4 Drawing Sheets

POSITION DETECTOR WITH RADIO TRANSMITTER AND RECEIVER

TECHNICAL FIELD

The present invention relates to a position detector using a contact needle which contacts with a work set on a table or a chuck of a machining tool to detect the three-dimensional position of the work. More particularly, this invention relates to radio wave radiating means for use with a position detector arranged such that a contact between a movable needle and a work is detected as an electrical signal, the electrical signal is transmitted by a radio wave and received by a receiver located at a fixed position.

BACKGROUND ART

To detect, for example, the work reference position of a work set on the machining work, the position of a work (an object to be detected) set on the table is searched for by a needle mounted on a tool spindle. Then, the contact between the needle and the work is electrically detected and the work reference position of the work is calculated from the positions of the tool spindle and the table upon detection.

One of the known position detectors of such kind has a needle which contacts with an object to be detected to detach its base portion from a seat surface keeping the static position of the needle so that it closes the internal contact to produce a detecting signal. Other one has an external contact formed of electrically-insulated needle and the detected object so that the contact between the needle and the work closes the external contact to produce a detecting signal.

Further, a known position detector has a movable detecting head whose detecting signal is transmitted to a receiver and a controller located at the fixed position by means of radio waves.

In the apparatus in which the detecting signal is transmitted by radio wave, the receiver located at a predetermined position can receive the detecting signal without fail irrespective of the positional relationship between a detecting head which includes the detecting needle and the transmitter. Thus, this apparatus is free from a cumbersome wiring between the movable detecting head and the receiver and the controller located at the fixed position.

According to the position detector for transmitting a detecting signal by radio wave, particularly when the detecting head is mounted on the rotary tool spindle of a machining tool to detect the position of the work, the mounting structure of the antenna at a transmitter side causes a problem. Specifically, since this kind of apparatus employs a battery as the power source of the transmitter, it is strongly requested to produce an output as small as possible in order to avoid the battery from being considerably consumed The antenna, however, has a directivity, so that when the tool spindle is moved and rotated, the directivity of the antenna is changed and the radio wave is not reached to the receiver. Further, depending on the position at which the detecting head is located, the work and the main body of the receiver hide the antenna and the receiver, hindering the transmission of radio wave to the receiver. To avoid these problems, it is proposed to mount a plurality of antennas on the transmitter or the like. However, the mountable space thereof is restricted, and the mountable position thereof is also restricted so as to avoid the interference with the machining tool and the work when the detecting head is moved. For this reason, the effective technique for generally completely solving these problems has not been found out yet.

The first object of this invention is to provide a technique for solving the above problems fully and which can positively transmit a detecting signal by radio wave to a receiver located at a fixed position irrespective of the movement of the detecting head including the detecting needle and the transmitter.

The second object of this invention is to provide a position detector which can be prevented from being mis-operated when various extraneous noises are produced in the radio wave under the circumstances in which the position detector is operated.

The third object of this invention is to provide a position detector having advantages brought about by both the above position detector having the internal contact and the above position detector having the external contact Specifically, the position detector having the internal contact can detect the position of an object to be detected, independently of the property of the object to be detected, conductive or a non-conductive. This type of position detector, however, cannot actuate its internal contact without time delay after the detecting needle and the object to be detected are brought in contact with each other. There is then a strong possibility that various errors may occur. Thus, this internal contact type position detector produces measured values that are considerably made different as compared with the external contact type position detector. While, the position detector having the external contact can detect at high accuracy the position of the object made of conductive material but it cannot detect the position of the object made of non-conductive material Therefore, the third object of this invention is to solve these problems.

DISCLOSURE OF INVENTION

To achieve the first object, the apparatus of the invention is so arranged as to supply a high frequency output from a transmitter for transmitting a detecting signal to a detecting needle itself which is mounted so as to detect an object to be detected. Referring to the reference numerals in the figures, the position detector of this invention comprises a detecting head 43 having electrical detecting means 45 and 47 for detecting the contact between a detecting needle 20 and an object 42 to be detected as an electrical signal and a radio transmitter 50 for transmitting the detected electrical signal, a radio receiver 70 for receiving the above signal and a controller 80 located at a fixed position, wherein the output from the radio transmitter 50 is supplied to the detecting needle 20 itself.

The second object of this invention can be achieved by the thus constructed position detector in which the carrier wave for the detecting signal, which is transmitted and received through radio wave, is made an FM wave and the signal delivered from the transmitter 50 is modulated by a double scale signal.

Further, a detecting needle 20 made of conductive material is attached to the detecting head 43 in an electrically-insulated fashion and to be freely movable in a three-dimensional manner and also biased to a predetermined static position. Also, the detecting head is provided with internal contacts 27 and 31 openable and closable when the detecting needle 20 moves from the static position. A first contact detecting circuit 45 including the external contact produces a first detecting signal A, for example, a signal of some specific frequency or amplitude. While, a second contact detecting circuit 47 including the internal contacts produces a second detecting signal B, for example, a signal having a frequency or amplitude different from that of the first detecting signal A. Then, the receiving side controller 80 is supplied with a different compensating value whether or not the first signal A is delivered prior to the second signal B, and calculates a measured value, thus the third object of this invention being achieved.

According to the above arrangement, if the object to be detected is made of conductive material, when the detecting needle 20 contacts with the object 42, the output current from the transmitter 50 flows through the detecting needle 20 to the object 42 and the main body of the machining tool, making the whole of the machining tool function as an antenna. Thus, irrespective of the position or rotation direction of the detecting head 43, the receiver 70 can positively receive the detecting signal of a predetermined level.

When the FM wave is employed as the carrier wave of the detecting signal and the detecting signal is modulated by the double scale signal and transmitted through radio wave, it is possible to completely remove such a risk that the position detector is affected or misoperated by extraneous noise.

Further, according to the position detector having the internal contacts and the external contact, if the object to be detected is made of conductive material, when the object 42 and the detecting needle 20 are brought in contact with each other, the first detecting signal A is delivered and then the second detecting signal B is delivered with a small time delay from the first detecting signal. Therefore, the receiving side apparatus receives the first detecting signal A prior to the second detecting signal B to thereby detect that the work is made of conductive material. At that time, the measured value is corrected by giving the measured value calculated from an input time point s of the detecting signal to a corrected value registered as a correcting value for the external contact.

If on the other hand the object 42 is made of non-conductive material, the external contact does not function as the contact so that the second detecting signal B is produced first at the time when the internal contact is actuated. Therefore, the absence of the first detecting signal A makes it possible to decide that the object 42 is made of non-conductive material. At that time, the measured value is corrected by giving the measured value calculated from the input time point s of the detecting signal to a corrected value registered as a correcting value for the internal contact.

BRIEF DESCRIPTION OF DRAWINGS

The drawings illustrate an embodiment of this invention, wherein.

Figure 1:
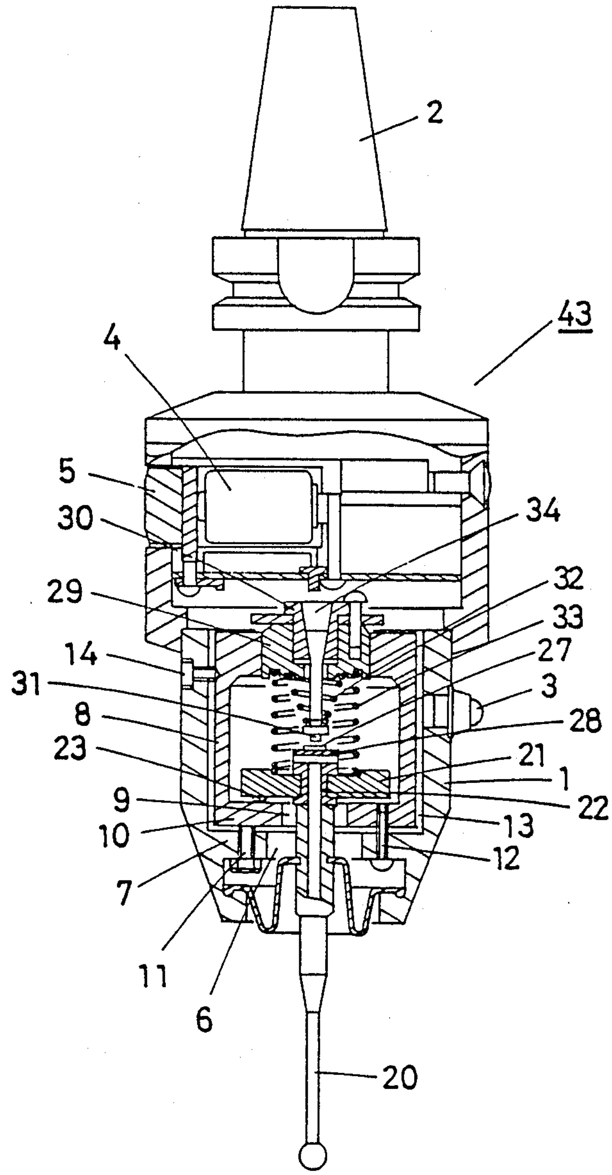
FIG. 1 is a cross-sectional view illustrating a structure of a detecting head in greater detail.

In the figures, reference numeral 1 designates the head housing, 4 the battery, 8 the inside casing, 20 the detecting needle, 21 the supporting disk, 22 the insulating material, 23 the hemispherically-shaped protrusions, 24, 25 and 26 the seats, 27 the internal contact at the detecting needle side, 28 the insulating material, 31 the internal contact at the housing side, 33 the compression spring, 35 the auxiliary spring, 42 the object to be detected, 43 the detecting head, 45 the first detecting circuit, 47 the second detecting circuit, 50 the transmitter, 55 the double scale signal generator, 56 and 57 the signal terminals thereof, 70 the receiver, 77 the signal discriminating circuit and 80 the CNC apparatus for the machine tool.

BEST MODE FOR CARRYING OUT THE INVENTION

An embodiment of this invention will hereinafter be described with reference to the drawings.

Figure 2:
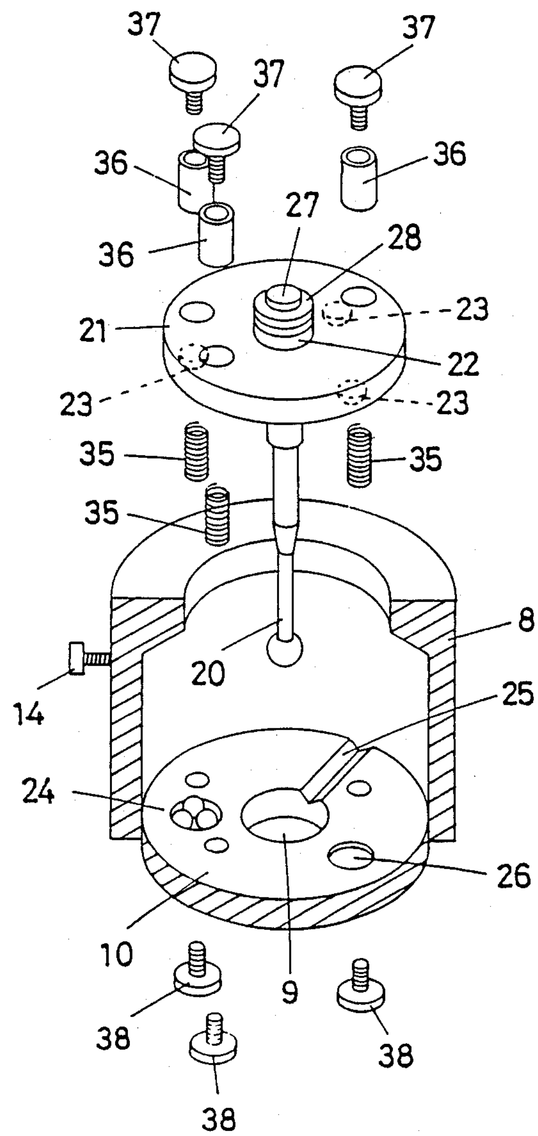
FIG. 2 is an exploded perspective view of a main portion showing a construction for supporting a detecting needle.

Referring to FIGS. 1 and 2, a head housing 1 is provided with a shank 2 and a display LED 3. The head housing 1 incorporates therein a battery 4 and has a battery lid 5. The head housing 1 has a bottom plate 7 having an opening 6 formed through its center. An inside casing 8 has an opening 9 formed through the center of a bottom plate 10 of the inside casing 8. Three screw seats 11 are embedded on the bottom plate 7 of the head housing with an angular spacing of 120°. Three fastening screws 12 are screwed through the bottom plate 7 of the head housing to the bottom plate 10 of the inside casing so as to have a phase difference of 60° relative to the screw seats 11. The inside casing 8 is suppressed to the screw seats 11 by the fastening screws 12 and supported thereby and is built into the head housing 1 with a certain clearance 13 therebetween. Three fine adjusting screws 14 are secured to the cylindrical portion of the head housing with an angular spacing of 120° in an opposing relation to the cylindrical portion of the inside casing. These fine adjusting screws move the inside casing 8 to fine adjust the inclination of the detecting needle 20.

The detecting needle 20 is supported by a supporting disk 21 and an insulating material 22 is interposed between the detecting needle 20 and the supporting disk 21. The detecting needle 20 is secured to the supporting disk 21 and extended through the openings 9 and 6 to the outside of the head housing 1. Hemispherically-shaped protrusions 23 are implanted on the lower surface of the supporting disk 21 with an angular spacing of 120°. On the upper surface of the bottom plate 10 of the inside casing, there are formed a first seat 24 formed of three balls, a second V-shaped groove seat 25 and a third planar seat 26 in an opposing relation to the protrusions 23 as shown in FIG. 2. The internal contact 27 is secured to the base end portion of the detecting needle 20 through an insulating material 28.

A spring stop 29 is engaged with the inside casing 8, and a contact holder 30 holds an internal contact 31 at the housing side. This internal contact 31 is biased downwards by a spring 32, and a compression spring 33 is stretched between the spring stop 29 and the supporting disk 21 to urge the supporting disk 21 downwards. The housing side internal contact 31 is inserted into a conical-shaped opening 34 of the contact holder 30 so as to be retractable upwards.

The supporting disk 21, accordingly, the detecting needle 20 can keep a stable static position by urging three hemispherically-shaped protrusions 23 against the first to third seats 24, 25 and 26 by the compression spring 33. In the illustrated embodiment, there are further used three auxiliary small tension springs 35 shown in FIG. 2 in order that the detecting needle 20 can return to the above static position as positively as possible. Two of three tension springs 35 are located near both sides of the first seat 24 and the remainder is located adjacent the second seat 25 at the side of the third seat 26. Since the hemispherically-shaped protrusions 23 are urged against the seats 24, 25 and 26 by the auxiliary springs 35, the detecting needle 20 can return to the stable static position as positively as possible. In FIG. 2, reference numerals 36 designate sleeves through which the tension springs 35 pass. Both ends of the tension springs 35 are respectively abutted against the supporting disk 21 side and the inside casing bottom plate 10 side by screws 37 and 38.

Figure 3:
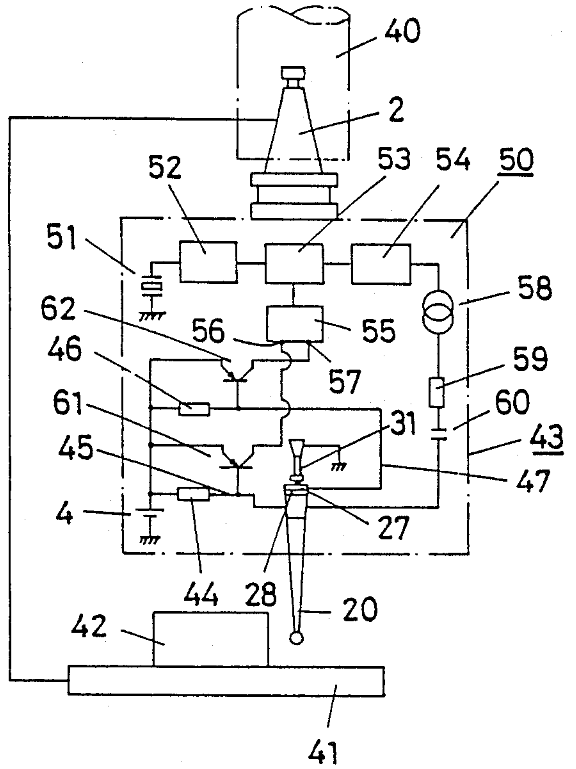
FIG. 3 is an electrical block diagram of the transmitting side.

In FIG. 3, reference numeral 40 designates a tool spindle of the machining tool, 41 a table of the machining tool and 42 a work set on the table. Reference numeral 43 generally designates the detecting head shown in FIG. 1. The detecting head 43 is mounted to the tool spindle 40 by means of the shank 2. The shank 2 and the work 42 are electrically conducted through the main body of the machining tool.

The supporting disk 21 is held by the biasing force of the compression spring 33 and the tension springs 35 at the static position and is also movable in the three-dimension against the biasing forces of the springs 33 and 35. The cathode of the battery 4 is grounded through the head housing 1 of the detecting head 43 while the anode thereof is connected to the detecting needle 20 through a resistor 44 to form the first detecting circuit 45, and is also connected to the contact 27 of the base end portion of the detecting needle through a resistor 46 to form the second detecting circuit 47.

Reference numeral 50 generally designates the transmitter which comprises a crystal oscillator 51, an oscillating circuit 52, a frequency modulating circuit 53, an amplifying circuit 54 and a DTMF (dual tone multi-frequency) circuit 55. In the illustrative embodiment, the DTMF circuit 55 is adapted to produce 16 double scale signals in 4×4 combinations of scales selected from two sets of four different kinds of scale groups and produces, when receiving input signals at its signal terminals 56 and 57, double scale signals set at the respective terminals 56 and 57. When the input signals are simultaneously supplied to the terminals 26 and 27, the input signal applied to the terminal 27 overrides the other.

The output from the amplifying circuit 54 is supplied through a mutual inductance 58, a resistor 59 and a capacitor 60 to the detecting needle 20. In other words, the detecting needle 20 itself functions as the antenna for the transmitter 50.

Transistors 61 and 62 are provided to supply detecting signals to the DTMF circuit 55. The bases thereof are connected to the detecting needle 20 and to the contact 27 provided at the base end portion of the detecting needle, the emitters thereof are connected to the anode of the battery 4 and the collectors thereof are connected to the signal terminals 56 and 57 of the DTMF circuit.

Figure 4:
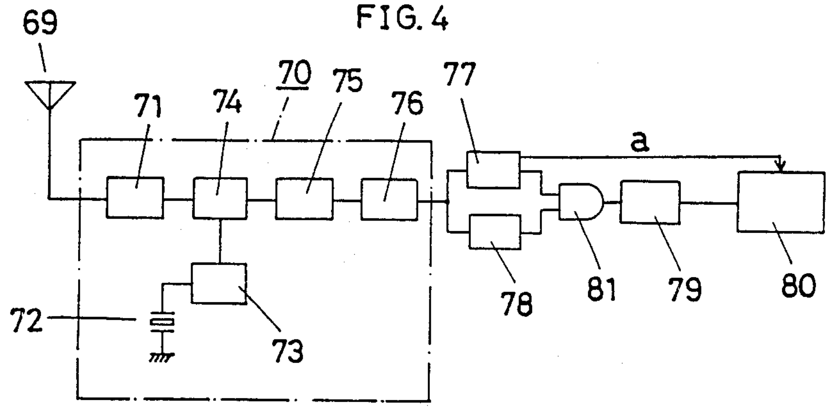
FIG. 4 is an electrical block diagram of the receiving side.

In FIG. 4, reference numeral 69 designates a receiving side antenna, and reference numeral 70 generally designates a receiver which comprises a high frequency amplifying circuit, a crystal oscillator 72, a local oscillator circuit 73, a frequency mixing circuit 74, an intermediate frequency amplifying circuit 75 and a demodulating circuit 76. Reference numeral 77 designates a signal discriminating circuit, and the double scale signals the same as those set in the DTMF circuit 55 at the transmitter side are set in this signal discriminating circuit. The signal discriminating circuit produces an output only when the received signal coincides with the thus set double scale signal. Reference numeral 78 designates a delay circuit, 81 an AND gate, 79 an interface circuit and 80 a CNC apparatus for machining tool. In this CNC apparatus there are registered in advance a correcting value for the external contact formed of a pair of the work and the detecting needle and a correcting value for the internal contact formed of the contacts 27 and 31. The correcting values are set in each of the detecting heads 43 used.

The operation of the above apparatus will be described next.

If the work 42 is made of conductive material, when the top of the detecting needle 20 comes in contact with the work 42, the first detecting circuit 45 formed from the anode of the battery 4 through the resistor 44, the detecting needle 20, the work 42, the main body of the machining tool and the shank 2 to the cathode of the battery is closed to flow a current through this circuit. This current causes a potential difference across the resistor 44. The potential difference turns the transistor 61 on and hence a detecting signal is supplied to the first signal terminal 56 of the DTMF circuit 55. This signal is converted into the double scale signal set at the terminal 56 and then fed to the frequency modulating circuit 53, whereby the FM carrier wave from the oscillating circuit 52 is thereby modulated and the modulated signal is amplified by the amplifying circuit 54 and then delivered.

The high frequency signal from the amplifying circuit 54 is supplied through the mutual inductance 58 and the capacitor 60 to the detecting needle 20. At that time, since the detecting needle 20 is in contact with the work 42, the high frequency signal from the amplifying circuit 54 is supplied to the work 42 and the main body of the machining tool, causing the whole of the machining tool to function as an antenna to radiate a radio wave. The radio wave is received by the receiving side antenna 69.

After the detecting needle 20 and the work 42 are brought in contact with each other, the detecting head 43 continues moving to incline the detecting needle 20, whereby the internal contacts 27 and 31 come in contact with each other to permit closing the second detecting circuit 47. Then, a detecting signal is supplied to the second signal terminal 57 of the DTMF circuit 55 and the signal transmitted from the transmitter 50 is converted into the output signal set at the second signal terminal 57. That is, as shown in FIG. 5, the transmitter 50 delivers the first signal A and then the second signal B.

Figure 6:
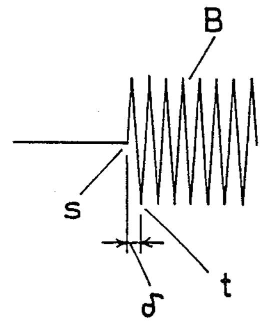
FIG. 6 is a schematic representation illustrating a signal produced when the work is made of non-conductive material and FIG. 7 is a schematic representation used to explain that the detecting signals rise at different timings.

If on the other hand the work 42 is made of non-conductive material, the external contact formed of the work 42 and the detecting needle 20 does not function so that the transmitter 50 delivers only the second signal B as shown in FIG. 6. The second signal is delivered with a time delay of a certain time period after the work 42 and the detecting needle 20 come in contact with each other.

Figure 5:
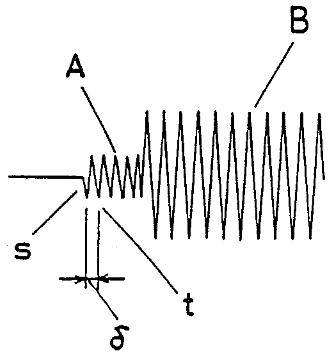
FIG. 5 is a schematic representation illustrating a signal produced when a work is made of conductive material.
Figure 7:
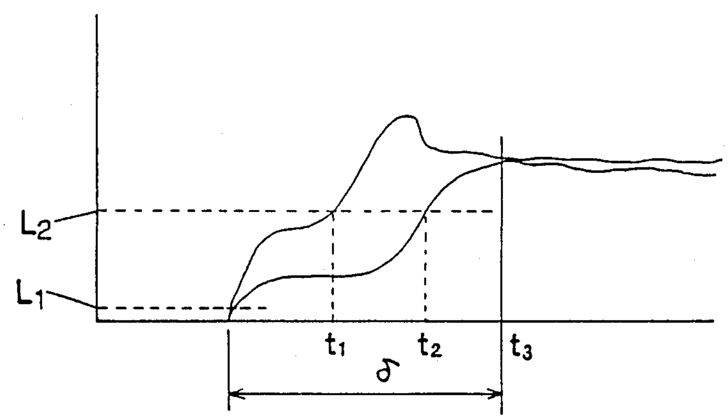

The output signal in FIG. 5 or 6 is received by the receiver 70. The signal discriminating circuit 77 identifies whether the received signal is the signal shown in FIG. 5 or 6 and then supplies its identifying signal a to the CNC apparatus 80. The delay circuit 78 supplies the detecting signal through the interface circuit 79 to the CNC apparatus 80 so long as the identifying signal a is delivered at a time point $t_3$ which is behind a time point at which the signal is first detected (time point $t_0$ in FIG. 7) by a predetermined time δ. The reason that the delay circuit 78 is provided is to remove a signal identifying timing ($t_1$ or $t_2$ in FIG. 7) error caused by the difference of the leading edges of the detecting signals as shown in FIG. 7. The delay time δ at that time is corrected by registering this delay time in the CNC apparatus 80 as a correcting value. In FIG. 7, $L_1$ represents the signal detecting level of the delay circuit 78 and $L_2$ the signal identifying level of the discriminating circuit 77.

The CNC apparatus 80 incessantly monitors the positions of the tool spindle 40 and the table 41 and controls the same so that when receiving the signal from the interface circuit 79, it latches the positions of the tool spindle 40 and the table 41 at that time point, produces the correcting value registered for the external or internal contact selected by the identifying signal a and calculates the position of the work 42. At that time, the delay time 6 is also corrected.

INDUSTRIAL APPLICABILITY

When the apparatus of this invention is used to detect the position of the work attached to the machining tool, the electrical signal generated by the contact between the contact needle mounted on the tool spindle and the work can be radiated as a radio wave while using the machining tool itself as the antenna by utilizing the above contact. Therefore, irrespective of the positional relationship among the moving detecting needle, the transmitter and the work, the receiver located at the fixed position can always receive the constant and stable signal. Thus, the detecting signal can be transmitted by the radio wave stably and accurately and the cumbersome wiring work for cables becomes unnecessary. Also, there is no risk that the signal transmission is hindered by the directivity of the antenna and its positional relationship relative to the work. In addition, the consumption of the battery at the transmitter side can be reduced.

Further, according to the preferred embodiment of the present invention, the single detecting apparatus can detect the position of the work independently of the conductive or non-conductive material which makes the work. When the internal contact type apparatus is used, its measuring accuracy can be avoided from being lowered as much as possible, and the position of the work can be detected with highest accuracy in accordance with the property of the work.

Furthermore, since the delay circuit is provided in the receiver side and the delay amount thereof is finally corrected by the previously-registered correcting value to calculate the measured value, the error brought about when the signals rise at different timings can be removed, thus making it possible to detect the position more accurately. In addition, since the main spring and the three auxiliary springs are used to place the detecting needle in its static position, the detecting needle can be returned to the static position with high accuracy. The static position of the detecting needle can be fine adjusted by the fine adjustment screw so that the position can be detected with extremely high accuracy.

I claim:

1. A position detector comprising a detecting head (43) having a detecting means (45,47) for detecting a contact between a detecting needle (20) and an object (42) to be detected and a radio transmitter (50) for transmitting a detecting signal from said detecting means and a receiver (70) for receiving said transmitted detecting signal, characterized in that an output from said transmitter (50) is supplied to said detecting needle (20).

2. A position detector according to claim 1, wherein said detecting needle (20) is made of conductive material and mounted on a head housing (1) electrically insulated therefrom and the detecting means includes a first circuit (45) having an external contact which is closed by the engagement between said detecting needle and said detected object if said object (42) to be detected is made of conductive material.

3. A position detector according to claim 1, including a detecting needle (20) mounted on the detecting head (43) so as to be freely movable in a three-dimensional manner and to be biased to a predetermined static position, and said detecting head (43) being provided with built-in internal contacts (27,31) openable or closable by the above movement of the detecting needle (20) and the detecting means includes a second circuit (47) closable by the actuation of said internal contacts.

4. A position detector according to claim 1, wherein the detecting needle (20) is made of conductive material and is mounted on the detecting head (43) to be freely movable in a three-dimensional manner and to be biased to a predetermined static position, said detecting needle being attached to and electrically insulated from the head housing (1), a first detecting circuit (45) which is closed by the contact between said detecting needle (20) and said detected object when said object (43) is made of conductive material, the detecting head (43) having built-in internal contacts (27,31) which are closed or opened by the movement of said detecting needle (20), and a second detecting circuit (47) which is closed by the actuation of said internal contacts, a transmitter (50) which delivers a first detecting signal (A) when said first detecting circuit (45) is closed and a second detecting signal (B) when said second detecting circuit (47) is closed, and a controller (80) applies to a measured value a different correcting value dependent on whether or not there exists said first detecting signal (A) before receiving said second detecting signal (B).

5. A position detector according to any one of claims 1 to 4, wherein a carrier wave for said radio transmitter and receiver is an FM wave.

6. A position detector according to claim 5, wherein said detecting signal transmitted from said transmitter (50) is a signal modulated by a double scale signal.

* * * * *